United States Patent
Lewicke et al.

(10) Patent No.: US 8,042,411 B2
(45) Date of Patent: Oct. 25, 2011

(54) SMALL LINE SIZE VORTEX FLOWMETER

(75) Inventors: Joseph J. Lewicke, Foxboro, MA (US); Paul F. Brosnihan, Millbury, MA (US)

(73) Assignee: Invensys Systems, Inc., Foxboro, MA (US)

( * ) Notice: Subject to any disclaimer, the term of this patent is extended or adjusted under 35 U.S.C. 154(b) by 322 days.

(21) Appl. No.: 12/478,571

(22) Filed: Jun. 4, 2009

(65) Prior Publication Data

US 2010/0307262 A1 Dec. 9, 2010

(51) Int. Cl.
*G01F 1/32* (2006.01)

(52) U.S. Cl. .................................................. 73/861.22

(58) Field of Classification Search ............... 73/861.22, 73/861.23
See application file for complete search history.

(56) References Cited

U.S. PATENT DOCUMENTS

| | | | |
|---|---|---|---|
| 3,823,610 A * | 7/1974 | Fussell, Jr. ................. | 73/861.24 |
| 4,220,046 A | 9/1980 | Sqourakes | |
| 4,475,405 A | 10/1984 | Corpron et al. | |
| 5,202,681 A | 4/1993 | Dublin, Jr. et al. | |
| 5,209,125 A | 5/1993 | Kalinoski et al. | |
| 5,447,073 A | 9/1995 | Kalinoski | |
| 5,463,904 A * | 11/1995 | Kalinoski ................... | 73/861.24 |
| 6,352,000 B1 * | 3/2002 | Getman et al. ............. | 73/861.22 |
| 7,007,828 B2 | 3/2006 | Speight | |
| 7,533,579 B2 | 5/2009 | Lewicke | |

OTHER PUBLICATIONS

Foxboro; I/A Series; 84 Series Intelligent Vortex Flowmeter; 2 pgs; Bulletin E38-5B 0609046 Nov. 2006; Foxboro, Foxboro, MA 02035-2099, USA.
Foxboro; I/A Series Intelligent Sanitary Vortex Flowmeter Model 83S-D and Model 83S-T FoxCom and Hart Communication Protocol; Product Specifications; 16 pgs; P5S 1-8A2D; Foxboro, Foxboro, MA 02035-2099.
Rosemount; Rosemount 8800D;Safety Messages, System Description and Replacing the Sensor: Removable and Integral Support Tubes; Reference Manual 00809-0100-4004, Rev AA Oct. 2006; 5 pgs.
Rosemount; Rosemount 8800D; Rosemount 8800D Series Vortex Flowmeter; Quick Installation Guide 00825-0100-4004, Rev CA Jan. 2008; 24 pgs; Emerson Process Management.
Rosemount; Rosemount 8800C; Rosemount 8800C Series Vortex Flowmeter;Product Data Sheet 00813-0100-4003, Rev NA Catalog 2006-2007; 42 pgs; Emerson Process Management.
Rosemount; Rosemount 8800D; Rosemount 8800D Series Vortex Flowmeter; Product Data Sheet 00813-0100-4004; Rev FA Catalog 2008-2009; 48 pgs; Emerson Process Management.
Tokyo Keiso Co.,Ltd.; Technical Guidance; Stainless Steel Body VF-5000 Vortex Flow Sensor; 4 pgs; May 2004; TG-EM137E-0; Tokyo Keiso Co.,Ltd., Tokyo, 105-8558, Japan.
AALBORG; Vortex Shedding Flow Meters; AALBORG; 1 pg; Downloaded Date Feb. 20, 2008; www.aalborg.com.
E.Clark & Associates; Clark Solutions Universal Vortex Flowmeters; 3 pgs; Technical Bulletin; Application, Design Installation; E. Clark & Associates, 10 Brent Drive, Hudson, MA 01749.

* cited by examiner

*Primary Examiner* — Jewel V Thompson
(74) *Attorney, Agent, or Firm* — Sampson & Associates, P.C.

(57) ABSTRACT

A vortex flowmeter and method includes a conduit for process fluid flow and a shedder disposed within the central bore of the conduit. First and second diaphragms are mounted in inner wall portions of the conduit, on opposite sides of the shedder. A sensor is disposed externally to the conduit, and is coupled to each diaphragm with fill tubes. The diaphragms respond to pressure variations generated by vortex shedding, and transmit pulse trains through the fill tubes to a sensor. The pulse trains, which are substantially out of phase with one another, are effectively synchronized with one another by reversing phase of one pulse train.

37 Claims, 8 Drawing Sheets

SMALL LINE SIZE VORTEX FLOWMETER

BACKGROUND

1. Technical Field

This invention relates to flowmeters, and more particularly to small line size flowmeters such as sanitary vortex flowmeters.

2. Background Information

Vortex flowmeters are commonly installed in-line within a process fluid flow conduit, to measure the flow rate of the process fluid. A bluff body in the fluid flow generates eddies, or vortices, downstream of the bluff body, on alternating sides of the bluff body. This trail of vortices is known as the Karman vortex street. The bluff body is commonly known as a shedder.

The meter is factory-calibrated, establishing the relationship between frequency and velocity, known as the K factor. The velocity of process flow may be determined from the frequency of the vortex shedding. This vortex shedding frequency may be captured by a sensor placed on the shedder, where it may efficiently detect pressure variations associated with the shedding.

Vortex flowmeters are used in a wide variety of processes, ranging from industrial applications such as oil and chemical processing, to sanitary applications such as food and pharmaceutical processing. While these flowmeters operate in a similar manner, regardless of the particular application, sanitary applications present challenges that typically are not found in other non-sanitary environments. For example, vortex flowmeters intended for sanitary applications must be capable of being thoroughly cleaned in order to meet applicable clean-in-place (CIP) requirements. In this regard, it is important to ensure that the flowmeters do not have crevices or pockets within which food particles, etc., may become trapped or lodged, and thus inhibit or prevent thorough cleaning between process runs. The U.S. Food and Drug Administration has even promulgated standards, such as the Pasteurization Milk Ordinance (PMO), 3A Sanitary Standards, in order to address these concerns. These standards have, however, proven to be relatively difficult to meet. Indeed, it is believed that to date, Invensys Systems, Inc., the assignee of the present invention, is the only major manufacturer which has qualified vortex flowmeters to these standards.

These Invensys vortex flowmeters have been able to comply with the PMO 3A Sanitary Standards by effectively embedding the sensor within the shedder. This configuration places the sensor sufficiently close to the vortex street to enable the single device to detect the pressure variations generated on both sides of the shedder during operation. This embedded location of the sensor also eliminates the need for a separate process penetration for the sensor, to thus eliminate the crevices or pockets that may be occasioned thereby.

While such embedded placement has been shown to effectively enable vortex flowmeters to meet these sanitary requirements, a drawback is that the shedder, and the corresponding inner diameter of the conduit, must be large enough to accommodate the sensor. This means that placing a sensor within the shedder may not be suitable for smaller line size conduits, e.g., those smaller than about 2 inches (5 cm) in diameter, because the shedder/integral sensor would block an inordinately large percentage of the cross-sectional area of the flowmeter conduit. In this regard, the vortex shedder typically has a precise geometry relative to the diameter of the flowtube. The width of the shedder face and the corresponding length and other dimensions of the shedder tail are all proportioned to the meter bore (inside diameter). In order to sense the vortex pressure pulses, a sensor diaphragm of a particular minimum size (effective area) is required to produce a signal from the sensor. Since the vortex sensor is integral with the shedder tail in a conventional sanitary vortex meter, the tail on sizes smaller than 2 inches has been found to not be large enough to accommodate an integral sensor. This factor has proven to be particularly problematic, since many food processing and other sanitary applications use line sizes of 2 inches (5 cm) or less.

Thus, a need exists for a sanitary vortex flowmeter, which efficiently measures vortex shedding in small line size conduits.

SUMMARY

In an aspect of the invention, a sanitary vortex flowmeter includes a conduit for process fluid flow in a downstream direction therethrough, the conduit having one or more inner walls defining a central bore. A shedder is disposed within the central bore, and a diaphragm is embedded in an inner wall portion of the conduit, adjacent to the shedder. A sensor is disposed remotely from the conduit. A fill tube containing a fill fluid is configured for communicably coupling the diaphragm, via the fill fluid, to the sensor.

In another aspect of the invention, a variation of the foregoing aspect includes a diaphragm, and an additional diaphragm embedded in opposite inner wall portions of the conduit, adjacent to the shedder. Fill tubes containing fill fluid are configured for communicably coupling each of the diaphragms to the sensor. Diaphragm holders are configured to maintain the diaphragms in their embedded positions in the conduit.

In another aspect of the invention, a method of producing a sanitary vortex flowmeter, includes disposing a shedder within a central bore of a conduit for process fluid flow; mounting a first diaphragm in an inner wall of the conduit, adjacent to the shedder; disposing a sensor externally to the conduit; and communicably coupling the first diaphragm to the sensor with a first fill tube containing fill fluid.

BRIEF DESCRIPTION OF THE DRAWINGS

The above and other features and advantages of this invention will be more readily apparent from a reading of the following detailed description of various aspects of the invention taken in conjunction with the accompanying drawings, in which.

DETAILED DESCRIPTION

Figure 1:
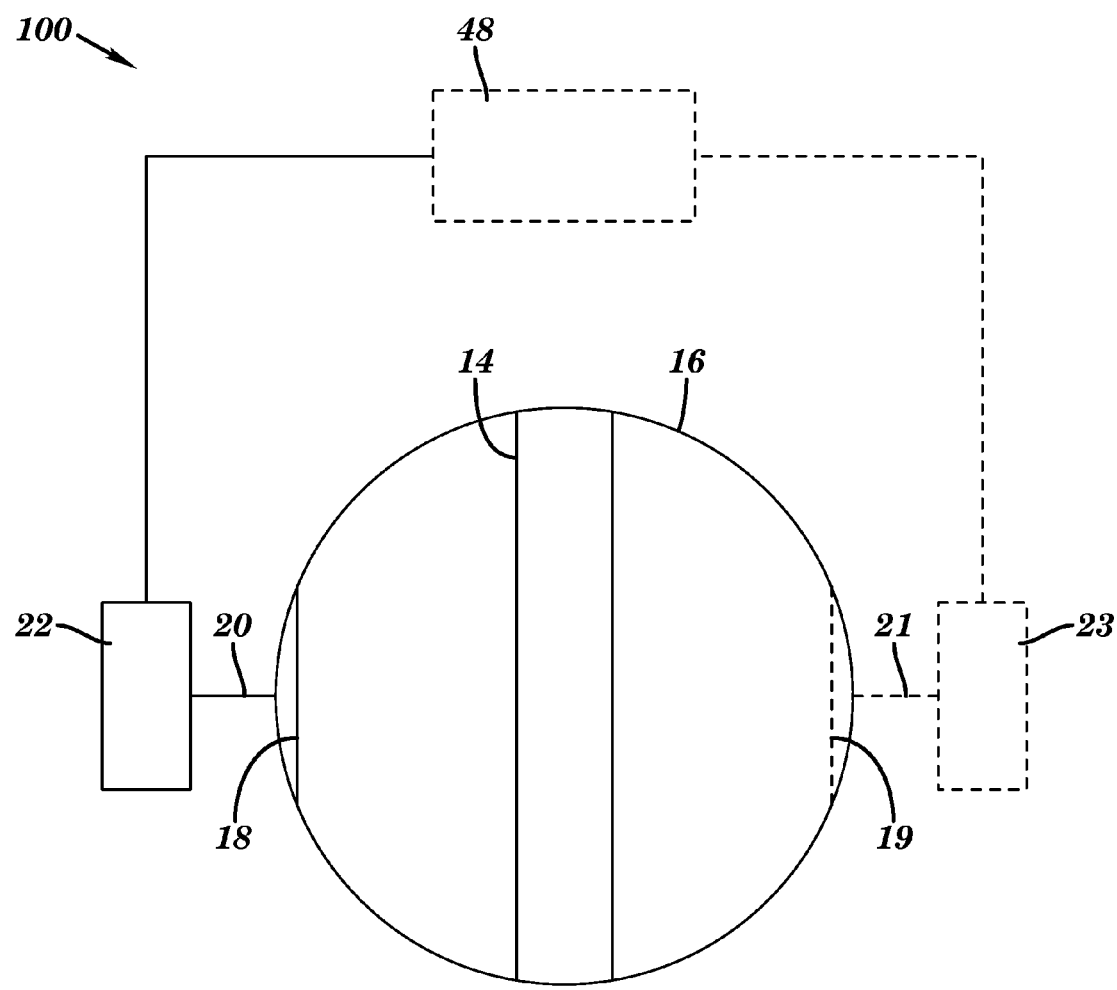
FIG. 1 is a schematic, transverse cross-sectional view, with optional aspects shown in phantom, of an embodiment of the claimed invention.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following detailed description is, therefore, not to be taken in a limiting sense, and the scope of the present invention is defined by the appended claims and their equivalents. For clarity of exposition, like features shown in the accompanying drawings shall be indicated with like reference numerals and similar features as shown in alternate embodiments in the drawings shall be indicated with similar reference numerals.

As used in the specification, the term "process fluid" refers to matter flowing through a conduit, including matter in solid, liquid, or gaseous forms, including combinations thereof. The term "transverse" refers to a direction which is orthogonal to a downstream direction of process fluid flow through the conduit.

Briefly, embodiments of the vortex flowmeters of the present invention include one or more diaphragms disposed on inner wall portions of the fluid flow conduit, proximate to the shedder. One or more sensors are disposed outside of the conduit, and communicably coupled to the diaphragm by a fill tube containing fill fluid. In operation, the diaphragm(s) moves in response to the pressure variations generated by the vortex shedding, to generate pressure pulses (e.g., a pulse train of pressure variations) that are conveyed through the fill fluid in the fill tube, to the sensor.

In particular embodiments, two diaphragms are disposed on opposite inner wall portions of the conduit, e.g., on opposite sides of the shedder. Fill tubes extend from each of the diaphragms to a single sensor, where their pulse trains are effectively combined. This use of two diaphragms (and optionally, combining their signals at a single sensor) tends to enhance detection of the shedding, e.g., by improving the signal to noise ratio of detection, particularly since the vortices are alternately generated on opposite sides of the shedder. This use of two diaphragms also facilitates the reduction or substantial elimination of noise generated by non-vortex pressure variations such as those known as common mode pressure pulsations, static pressure effects, and the like, as will be discussed in greater detail hereinbelow.

The diaphragm(s) may be fabricated from any number of flexible/resilient materials compatible with sanitary applications. The use of such flexible/resilient materials also enables the diaphragms to be secured or integrated in a relatively tight (e.g., press-fit, welded, or other liquid tight) configuration to the inner wall portion of the conduit, to effectively form a smooth, embedded configuration without forming crevices or pockets between the diaphragm and wall. In particular embodiments, the diaphragms may be fabricated from metallic materials, such as stainless steel. In other embodiments, the diaphragms may be fabricated from lubricious, heat resistant polymeric materials such as those including polytetrafluoroethylene (PTFE), such as sold under the trademark TEFLON® by DuPont. The entire diaphragm may be fabricated from such polymeric materials, either alone or blended with other materials, or may be applied as a film or layer to the process-contacting face of the diaphragm. The use of lubricious materials may further facilitate sterilization/sanitation of the flowmeter by helping to ensure that particulate from the process fluid does not become entrapped thereon. In still other embodiments, the diaphragm(s) may be fabricated as a relatively thin-walled portion of the conduit wall itself.

In some embodiments, the diaphragm(s) is mounted within a holder that may be tightly engaged with the conduit wall portion, nominally without creating crevices or pockets inside the conduit in which particles from the process fluid may be entrapped. Use of these discrete diaphragm holders tends to modularize construction, enabling the diaphragms to be conveniently removed from the flowmeter without the need for substantially disassembling the flowmeter. Such a configuration may not only facilitate servicing of the diaphragms, but may also facilitate cleaning/sanitation after use.

These embodiments enable the sensor to be disposed remotely from the fluid flow conduit, so that it does not have to fit within the inner diameter of the conduit. As such, these embodiments may be used with flowmeters configured for relatively small line sizes, e.g., those smaller than 2 inches (5 cm). Particular examples of these embodiments have been fabricated for line sizes of 1.5 inch (3.8 cm), one inch (2.5 cm), and ¾ inch (1.9 cm).

Turning to the Figures, embodiments of the present invention will be discussed in greater detail. As shown schematically in FIG. 1, a vortex flowmeter 100 includes a shedder 14 extending along a diameter of a fluid flow conduit 16. A diaphragm 18 is disposed on an inner wall portion of conduit 16, adjacent to the shedder 14. A sensor 22 is disposed externally, i.e., remotely, to the conduit. Diaphragm 18 is communicably (e.g., hydraulically) coupled to sensor 22 by a coupling 20, which in particular embodiments may be a fill tube, which contains fill fluid.

As discussed above, the vortex shedding generates pressure variations within the process fluid, which in turn, generates movement of the diaphragm 18. The diaphragm 18 acts as a fluid-tight partition between the process fluid in conduit 16 and the fill fluid in fill tube 20. The movement of the diaphragm, however, generates a pulse train of pressure variations that are conveyed through the fill fluid of fill tube 20, to the remote sensor 22. Sensor 22 may be substantially any device capable of generating electrical signals in response to mechanical movements/pressure pulses, such as, for example, a conventional piezoelectric crystal, e.g., in the form of a piezoelectric cantilever.

Optionally, an additional diaphragm 19 may be mounted onto the conduit and connected to a single sensor 22' (FIG. 2) via a second coupling 21, which in particular embodiments may be a second fill tube. Another option is to connect the additional diaphragm 19 to a second sensor 23 via a second coupling (e.g., fill tube) 21, as shown in phantom. The signals from the two sensors 22, 23 may then be processed with processing module 48.

Although couplings 20 and 21 are shown and described in various embodiments as fluid filled fill tubes, couplings 20 and 21 may also be non-fluidic mechanical couplings. For example, as shown in FIG. 1, couplings 20, 21 may be configured as direct mechanical linkages extending between diaphragms 18, 19, and sensors 22, 23 respectively. This direct mechanical connection may be facilitated by disposing the sensors within the diaphragm holders 24, 25, 24', 25' as discussed hereinbelow.

Turning to FIGS. 2-5, as discussed above, the flow of process fluid in the downstream direction (shown by arrows 30, FIG. 3A, 3B) is partially blocked by the shedder 14, causing a Karman street of vortices downstream from the shedder. These vortices shed alternately on opposite sides of the shedder. Thus, to facilitate and/or enhance the sensitivity of detection of this opposite shedding, it may be desirable in some applications to provide a second diaphragm, e.g., on a wall portion opposite that of the first diaphragm. Such an embodiment is shown as flowmeter 200, in which diaphragm 19 is disposed on a wall portion opposite that of diaphragm 18, and both diaphragms 18, 19 being communicably coupled by fill tubes 20 and 21, respectively, to a single sensor 22' with its own fill tube 21.

Thus, in this embodiment, the sensing function is essentially split between diaphragms 18, 19, which are each sufficiently sized to sense the pressure pulses, in the wall of the flowtube. While an additional sensor may be used (as discussed in greater detail below), embodiments of the invention that use a single sensor 22' provide a convenient approach for mechanically merging pulse trains from both diaphragms to provide a unified output having a relatively high signal to noise ratio.

In this regard, it should be recognized that diaphragms 18, 19 are disposed on opposite sides of conduit 16, i.e., for enhanced response to pressure pulses that alternate between opposite sides of the shedder. As such, they will tend to be out of phase with one another, with a pressure increase on one side of the conduit accompanied by a pressure decrease on the opposite side, and vice versa. This phenomenon is in many respects inconsequential when captured in a conventional manner by a single sensor that is centrally located on the shedder. However, when attempting to combine outputs captured on opposite sides of the conduit, this issue may be problematic. Embodiments of the present invention address this issue by coupling the fill tubes 20, 21 to opposite faces of the sensor 22' as shown. Sensor 22 may be a piezoelectric bimorph cantilever, which effectively includes two piezo crystals fused together, with deflection of the monolithic fused structure producing a differential signal with a plus signal from one side of the bimorph and a minus signal from the other side of the bimorph. So configured, the pulse trains from each diaphragm are combined so that they effectively drive sensor 22' in phase with one another, to provide an enhanced result with a higher signal to noise ratio than would be otherwise achieved using a single conduit-wall mounted diaphragm.

As mentioned above, this use of two diaphragms also facilitates the reduction or substantial elimination of noise generated by non-vortex shedding pressure variations such as common mode pressure pulsations, static pressure effects, and the like. In this regard, since the effective areas of the two opposed diaphragms 18, 19 are substantially similar, noise such as generated by common mode pressure pulses and the like, will tend to actuate the diaphragms in phase with one another. These in phase pulses are thus easily distinguished from the oppositely phased pulses of vortex shedding. Indeed, in the embodiment of FIGS. 2-5, one skilled in the art will recognize that such noise pulses will be conveyed to opposite sides of sensor 22' substantially simultaneously, to effectively cancel one another.

Use of a single sensor 22' as described also helps to eliminate static pressure errors by provision of a small hole or other passage that hydraulically connects both sides of the sensor. This passage allows the hydraulics on opposite sides of the sensor to equilibrate, to compensate for any slight differences therebetween, such as slightly different "effective areas" of the diaphragms 18, 19, due to typical manufacturing tolerances, etc. Those skilled in the art will recognize, in light of the instant disclosure, that without this provision for equilibration, any slight difference in diaphragm effective area may generate a bias load against the bimorph 22'. It should also be noted that the passage connecting both sides of the sensor is configured to be small enough (in cross-sectional area) so that very little energy of the vortex pressure pulse is lost, i.e., so as to not present a significant impediment to vortex detection. An example of such a piezoelectric bimorph cantilever that may be used with embodiments of the present invention includes that used in the E83, 83, and 84 Series Vortex Flowmeters available from Invensys Systems, Inc. (Foxboro, Mass.).

It should be noted that while diaphragms 18, 19 are shown as both coupled to a single sensor 22', the invention is not limited to this configuration. Rather, as shown in FIG. 1 and discussed above, each diaphragm 18, 19 may be associated with its own sensor 22, 23 with each sensor providing a separate electrical signal to a processing (e.g., summation) module 48. In such a configuration, the processing module 48 may sum the total signal (e.g., a plus signal from one sensor and a minus signal from the other sensor), to provide a unified output. As discussed above, it may also be desirable to equilibrate the opposite hydraulic systems relative to one another, to compensate for any differential between the two sensors 22, 23. This may be accomplished by configuring the processing (summation) module 48 to effectively subtract any bias of one sensor relative to the other sensor, to remove the effects of any difference in effective areas of the diaphragms 18, 19, etc. This multi-sensor approach may be advantageous in some applications, since it may tend to reduce any thermal errors associated with the fill fluid, by enabling a reduction in fill fluid volume (e.g., by use of shorter fill tubes 20, 21) relative to other approaches.

Thus, whether one or more sensors 22, 22', 23 are used, various embodiments of the invention effectively split the sensing operation by the use of at least two diaphragms 18, 19, disposed on opposite wall portions of the conduit 16, while providing convenient means for merging the pulse trains from both diaphragms to provide a unified output having a relatively high signal to noise ratio.

Moreover, while two diaphragms are shown and described with respect to flowmeter 100', it should be noted that additional diaphragms may be used, such as in spaced location along the opposite wall portions of the conduit 16, as may be desired in some applications to provide additional detection sensitivity/redundancy. For example, additional diaphragms may be used to provide static pressure measurement detection, common mode pressure detection, etc. Moreover, the embodiments described herein may be used in conjunction with additional sensors, such as pressure sensors, temperature detectors, etc., such as in a multivariable flow measurement device.

Embodiments for sanitary applications include a "sanitary finish" conduit interior wall, which as discussed above, is free of cracks and crevices in which particles may become lodged. In particular sanitary finish embodiments, the flowtube conduit 16 is constructed from thin walled stainless steel tubing, with the shedder 14 welded thereto. For example, portions on opposite sides of conduit 16 may be flattened, such as shown at 50, 51 (FIG. 2), and a tightly-toleranced hole 52, 53 (FIG. 2) may then be provided in each flattened area. A shedder bar 14 having ends sized and shaped to closely fit the holes 52, 53 may then be inserted therein.

In this example, the shedder bar is inserted, aligned, and then held in alignment, such as by tack welding. The tack welding is followed by a full (e.g., automated) welding of the shedder bar to the conduit. This full (automated) welding may be conveniently accomplished from the outside of the conduit, to minimize disruption of the interior conduit wall to facilitate creation of the sanitary finish. The full welding may advantageously be accomplished using conventional autogenesis welding, which does not require a metal filler. The weld would then be purged, leaving a smooth interior finish. In some cases, the interior wall may be polished to further smooth the interior wall as may be required to meet industry sanitary requirements.

The diaphragm assemblies may be installed using a similar process. For example, a circular area may be flattened on each side of the tube, with a tightly-toleranced hole configured to receive a diaphragm assembly. In this example, the diaphragm assembly includes a diaphragm 18, 19 already welded to a backing plate (e.g., diaphragm holder 24, 25, respectively). The diaphragm assembly may be initially tack welded into place, and then fully welded using a conventional autogenesis approach as discussed above. The resulting assembly is a conduit with a welded-in shedder bar, and an inner conduit wall with a substantially crevice-free weld finish. In this example, end connections may be welded to the conduit inlet and outlet. These welded connections may be ground and polished from the ends of the conduit, producing a sanitary, crevice-free interior finish.

Figure 3A:
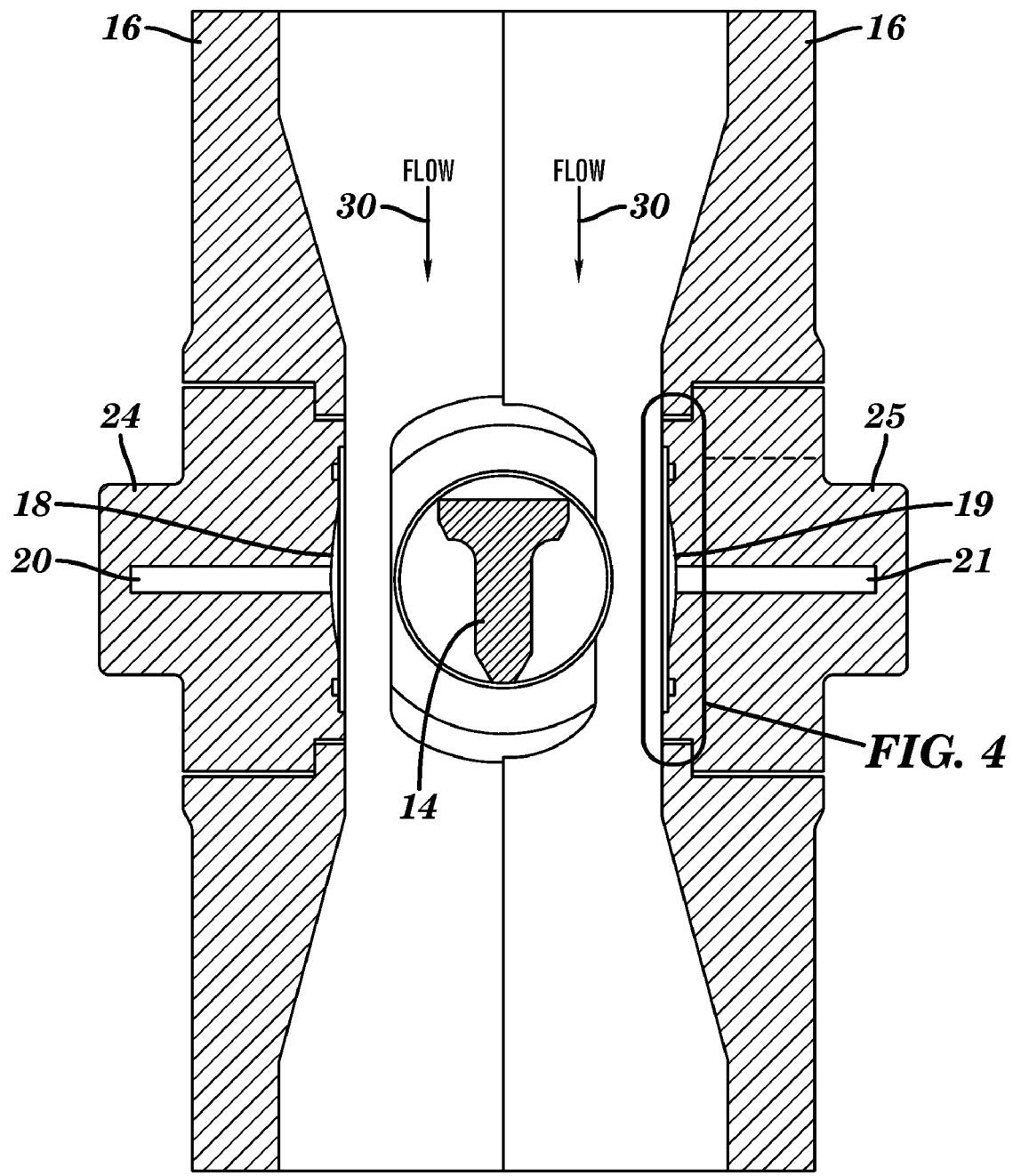
FIG. 3A is an axial cross-sectional view taken along 3-3 of FIG. 2.
Figure 4:
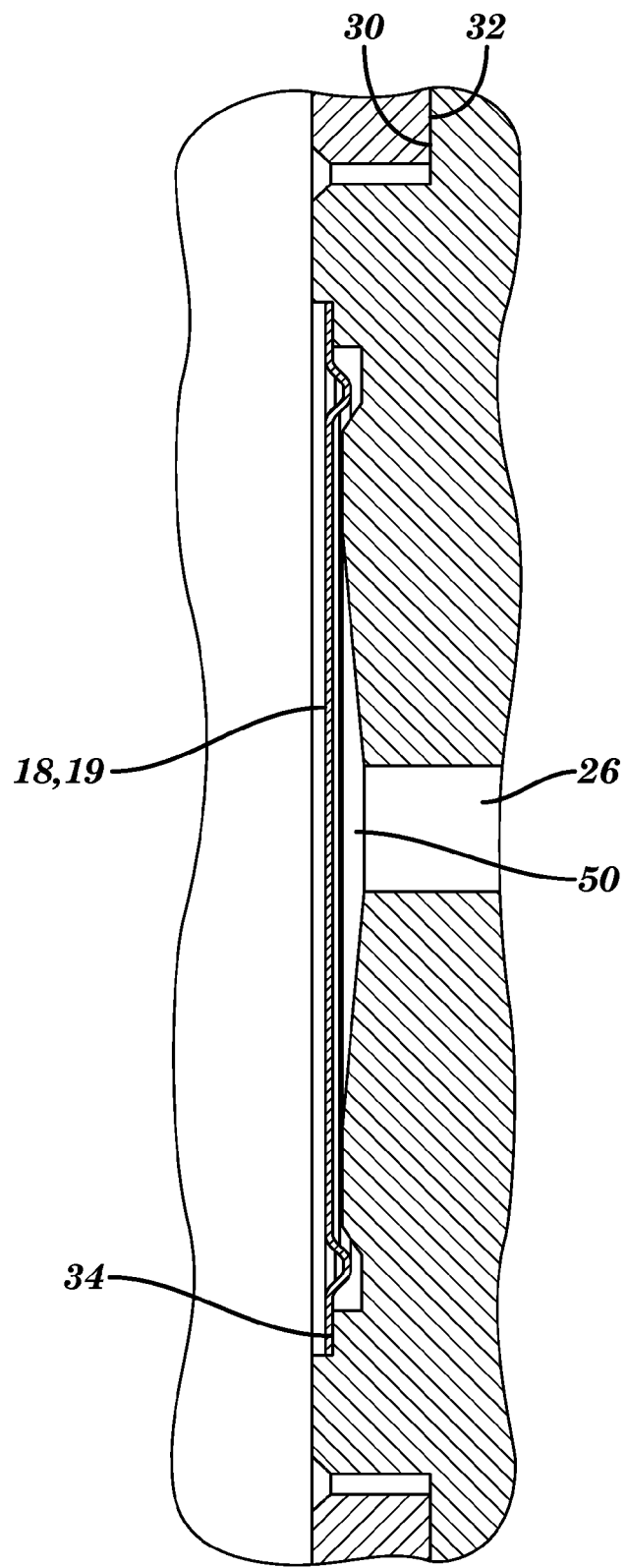
FIG. 4 is a view, on an enlarged scale, of a portion of the embodiment of FIG. 3A.

Referring in particular to FIGS. 3A and 4, examples of diaphragm holders 24, 25 include a seat 34 configured for fluid-tight (e.g., surface to surface) engagement with a periphery of the diaphragms 18, 19. This engagement may be secured in any suitable manner, such as by use of adhesives, the aforementioned welds, and/or mechanical fastening means. The diaphragms 18, 19 may thus be permanently fastened to the holders 24, 25, so that the holders, including the diaphragms, may be installed (and/or replaced) as a single integral unit. Alternatively, the diaphragms may be removably secured to the holders 24, 25, so that for maintenance purposes, the holders may be reused after being fitted with new diaphragms.

Holders 24, 25 also include a cavity 50 adjacent the outer face of the diaphragm (i.e., adjacent the diaphragm face which is not exposed to the process fluid). Cavity 50 is sized and shaped to allow the diaphragms 18, 19 to flex in response to the vortex shedding of the process fluid, as discussed above. Cavity 50 extends into a bore 26 which is communicably coupled (e.g., via couplings 52, FIG. 5) to proximal ends of fill tube 20, 21, in a fluid-tight engagement.

As discussed above, these holders may be configured for receipt within a suitably sized and shaped recess within the wall portion of conduit 16. This receipt may be configured with sufficiently tight dimensions to substantially avoid the creation of any crevices therebetween that would render the flowmeter unsatisfactory for some uses. Any number of approaches may be used to provide this secured receipt. For example, as shown, the holders may be provided with a flange 30 (FIG. 4) sized and shaped for surface to surface engagement with a seat 32 (FIG. 4) disposed in the wall portions of conduit 16. Once so disposed, the holders 24, 25 may be secured in position by nominally any desired fastening means. In this regard, the fastening means may include means for substantially permanent attachment, such as press fitting or welding as discussed above.

Figure 3B:
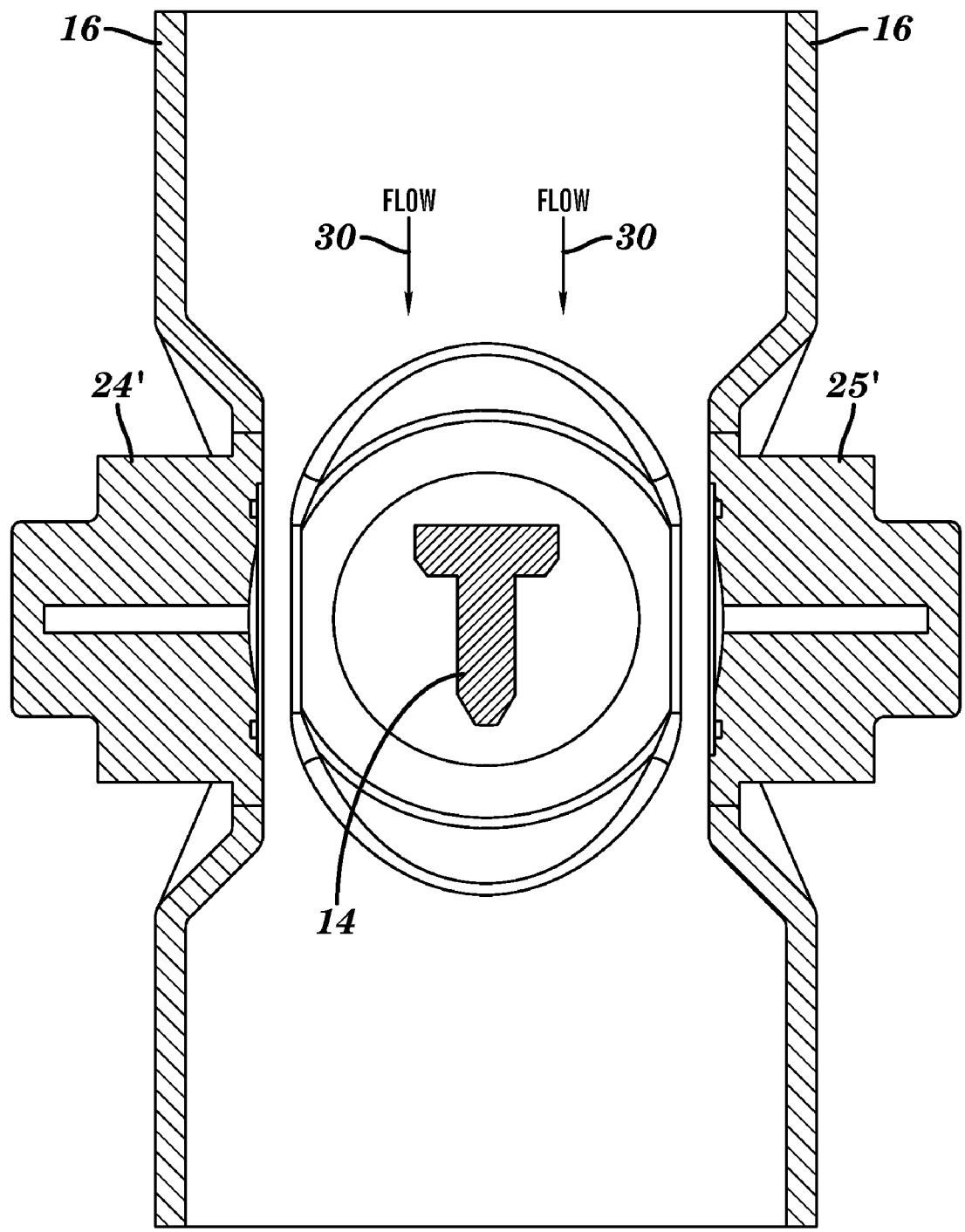
FIG. 3B is a view similar to that of FIG. 3A, of an alternate embodiment of the invention.

As shown in FIG. 3B, in particular embodiments, holders 24', 25' may be configured without a flange 30 (FIG. 4) to facilitate autogenesis welding from the exterior of the flowtube. This approach, in combination with relatively tight tolerances between the holders 24', 25' and the flowtube as shown, facilitates the minimization of crevices on the interior flowtube wall, such as for sanitary applications.

Alternatively, releasable mechanical fasters, such as threaded fasteners, spring-biased clamps, etc., (not shown) may be used. Releasable fasteners thus enable the holders 24, 25 to be conveniently removed to facilitate cleaning of the flowmeter after use, e.g., to comply with sanitary requirements.

As also shown, diaphragm holders 24, 25 are configured so that when properly disposed within conduit 16, the diaphragms 18, 19 are each maintained in substantially tangential alignment with the inner walls of the conduit 16, e.g., to effectively form portions of the inner conduit wall, so that no substantial crevices are formed in the conduit wall. In this regard, although shown as separate components, those skilled in the art should recognize, in view of the instant disclosure, that the diaphragms may integral to the conduit 16, such as formed by a relatively thin-walled portion of the conduit wall itself.

Figure 2:
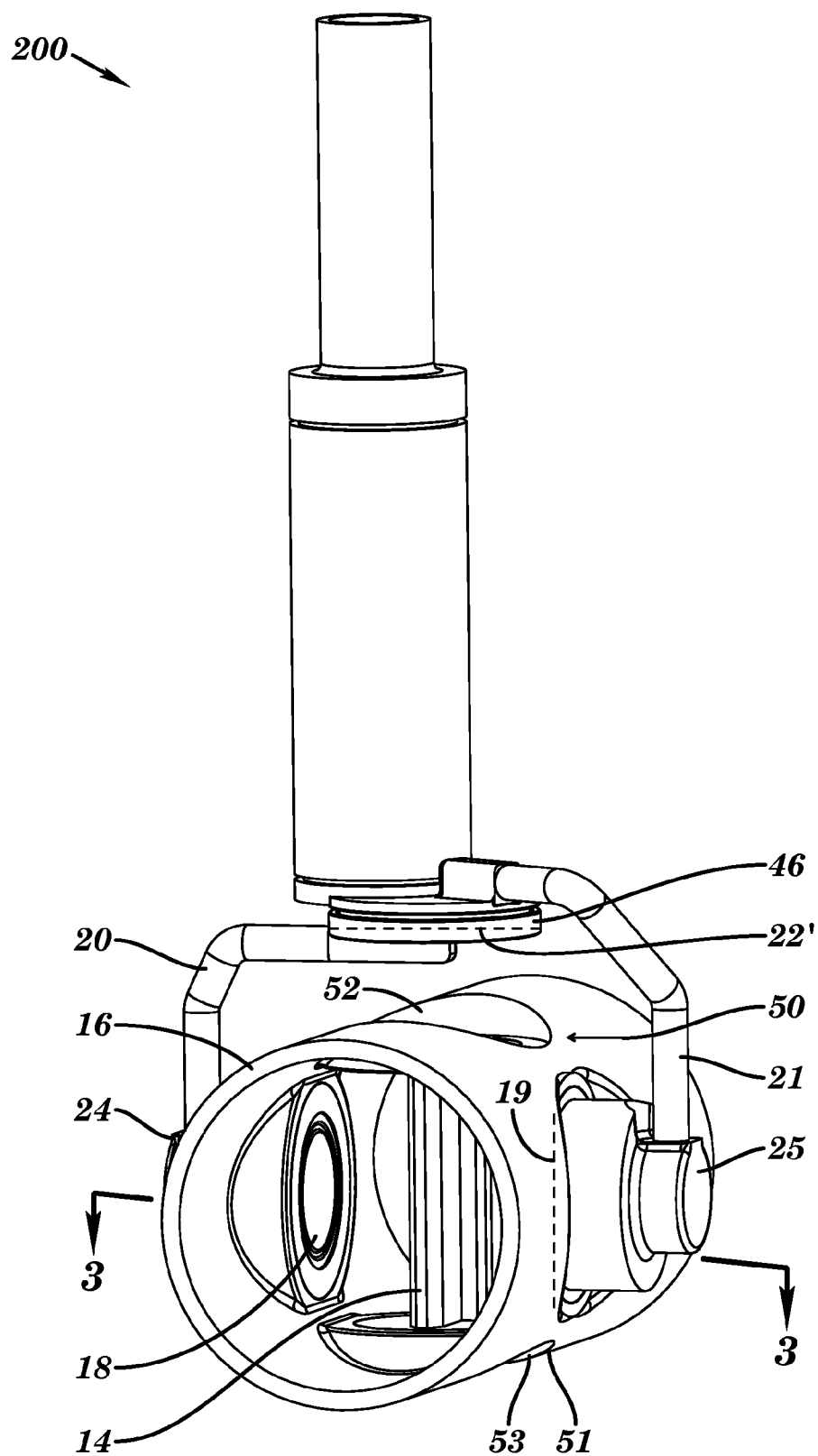
FIG. 2 is a perspective, partially schematic view of an alternate embodiment of the claimed invention.
Figure 5:
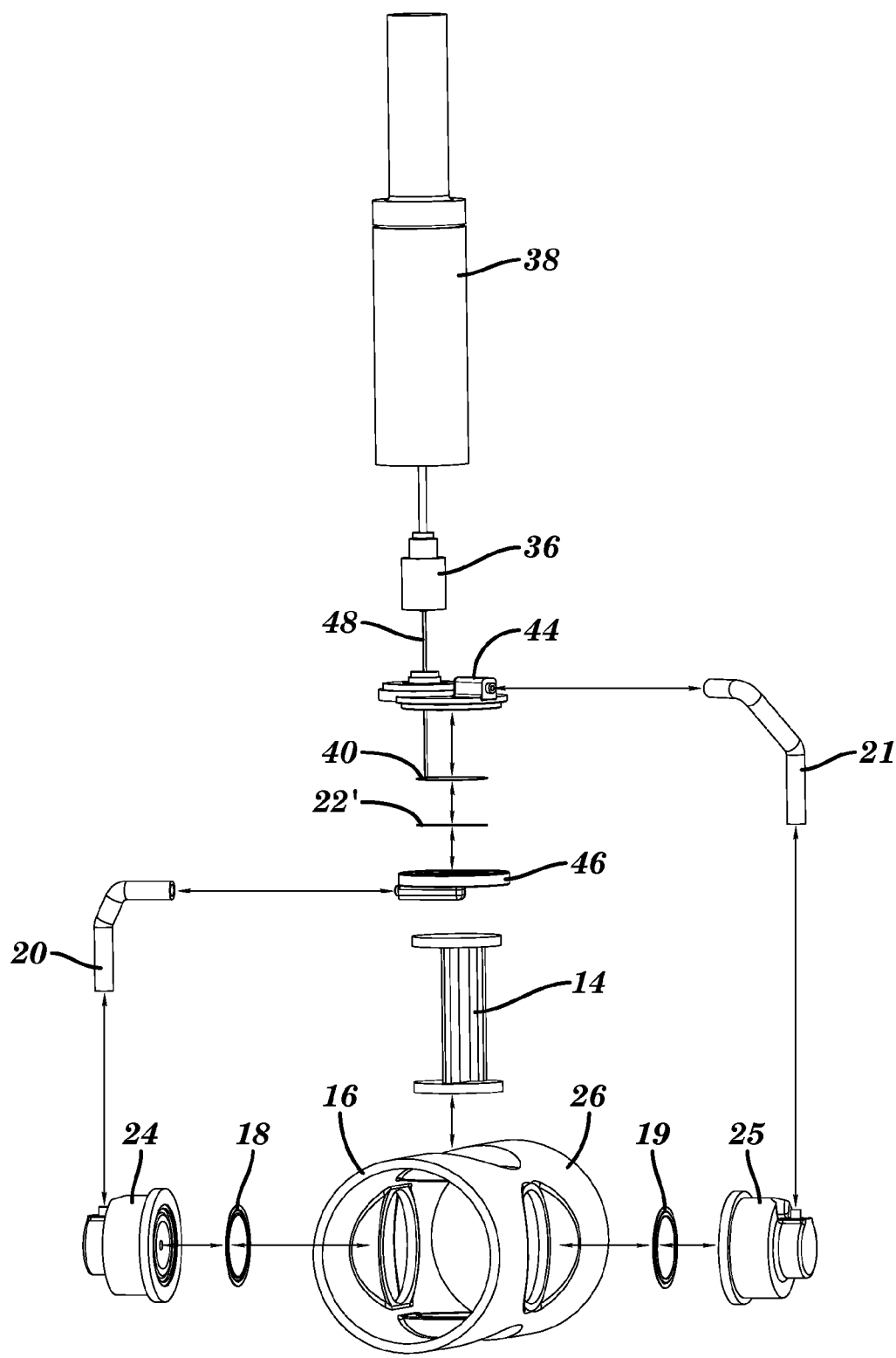
FIG. 5 is an exploded view of the embodiment of FIGS. 2-4.

As best shown in FIGS. 2 and 5, in particular embodiments, sensor 22' is housed in a sensor holder 46 disposed outside/remotely from the conduit 16. Holder 46 includes first and second portions 42, 44, having couplings configured to respectively engage distal ends of fill tubes 20, 21 so that the tubes are communicably coupled to the sensor 22'. The sensor holder 46 encloses an electrode 40 (FIG. 5) coupled to sensor 22, which transmits its signal through cable 48, which extends through seal assembly 36 and cable housing assembly 38, for capture by a conventional transmitter (not shown), such as available from Invensys Systems, Inc. (Foxboro, Mass.).

Figure 6A:
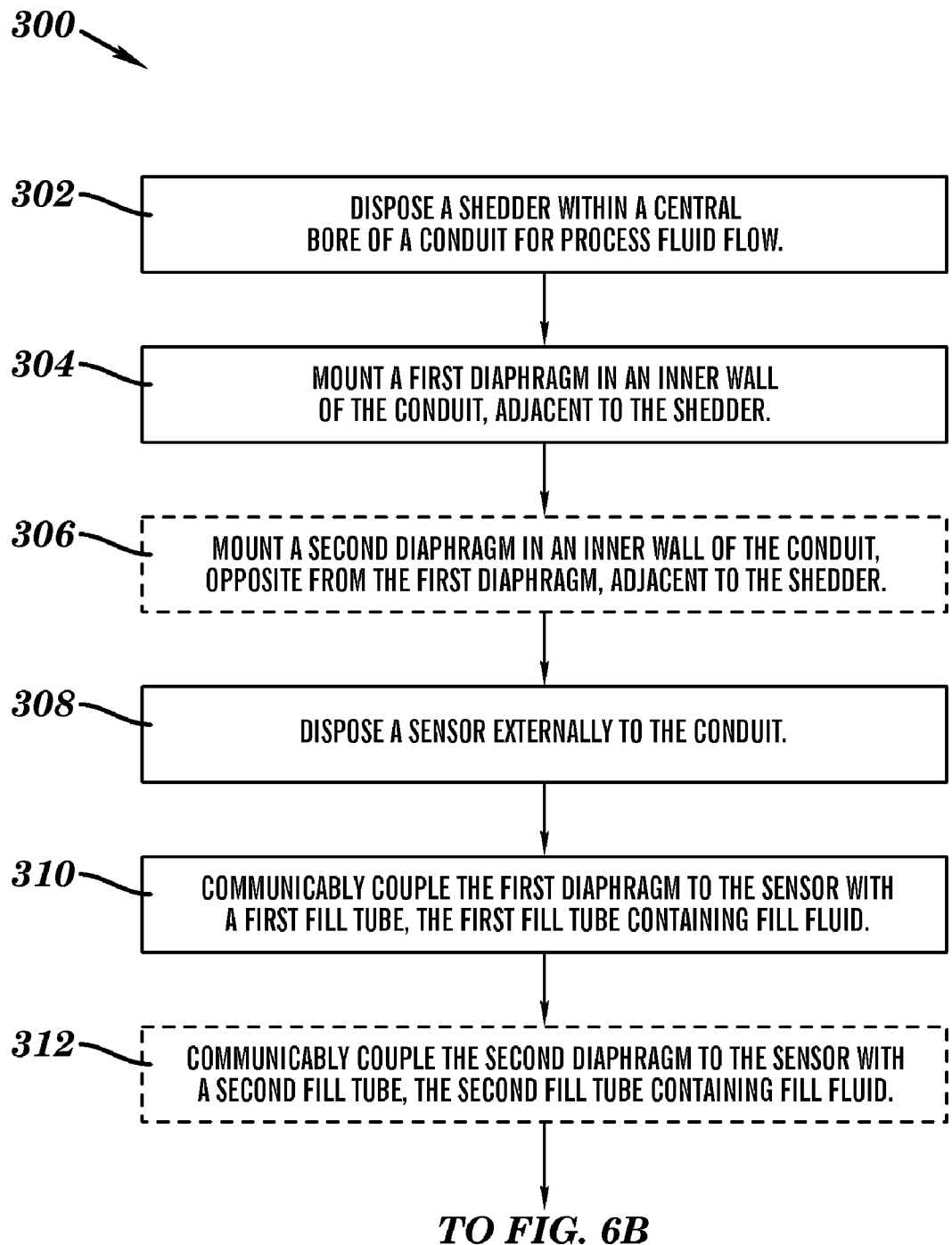
FIGS. 6A, 6B are flow charts of a method associated with embodiments of the present invention.
Figure 6B:
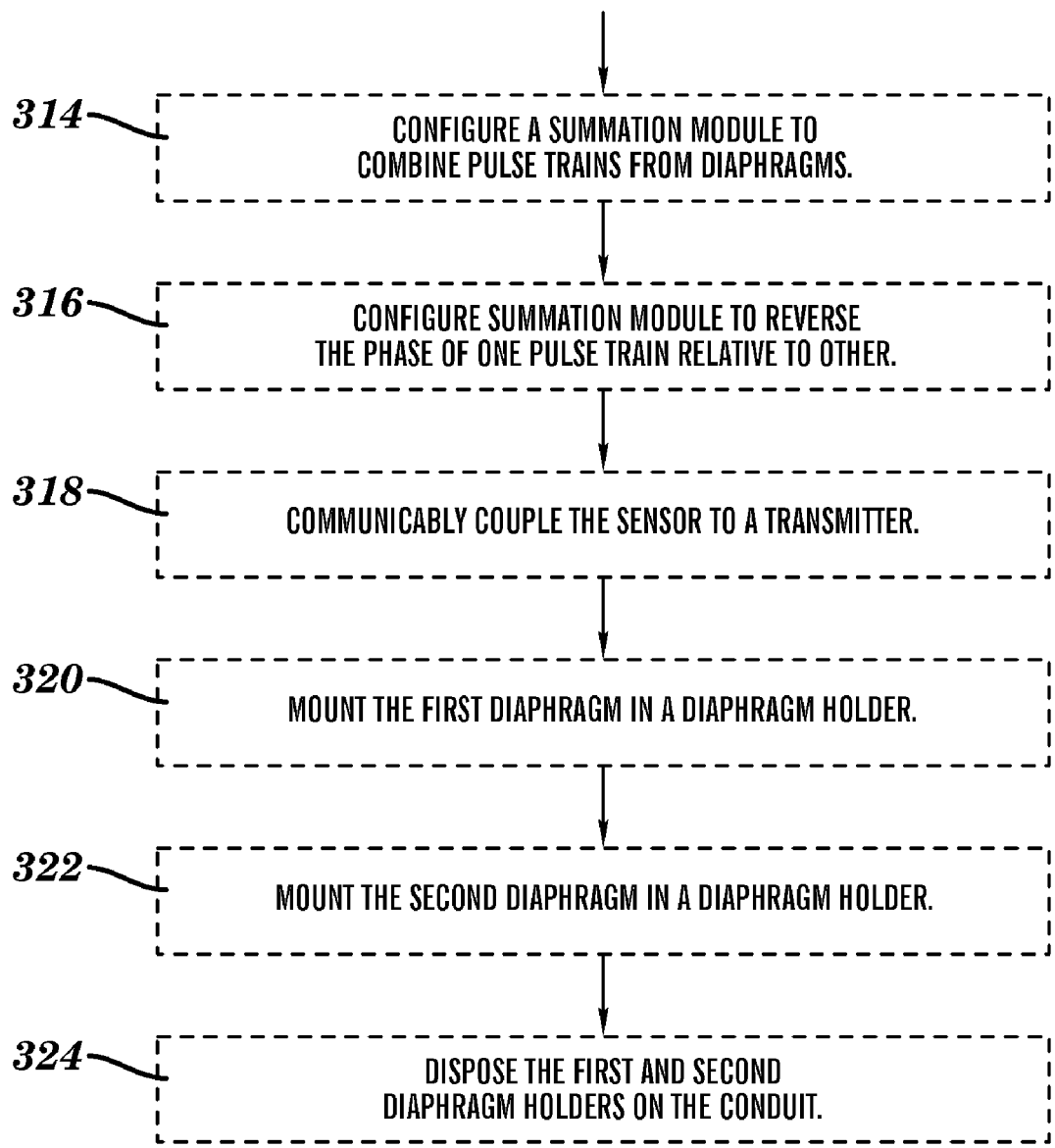

Turning now to FIGS. 6A and 6B, a method for fabricating a vortex flowmeter of the present invention is shown. At 302, a shedder is disposed within a central bore of a conduit for process fluid flow. A diaphragm 18 is mounted 304 in an inner wall of the conduit, adjacent to the shedder. Optionally, another diaphragm 19 is mounted 306 in an inner wall of the circuit, adjacent to the shedder and opposite from diaphragm 18. A sensor is disposed externally to the conduit at 308. Diaphragm 18 is communicably coupled 310 to the sensor with a fill tube 20, which contains fill fluid. Optionally, the other diaphragm 19 is similarly coupled 312 to the sensor using another fill tube 21, which also contains fill fluid.

At optional 314, a summation module is configured to combine pulse trains from the first and second diaphragms at the sensor. Optionally, the summation module is configured 316 to reverse the phase of one of the pulse trains relative to the other of the pulse trains, such as by communicably coupling the fill tubes to opposite faces of a single sensor, and/or by use of a processor to receive outputs from separate sensors and effectively reverse the phase represented by data captured from one of the sensors relative to the other. At 318, the sensor is optionally communicably coupled to a transmitter. One or both diaphragms 18, 19 are respectively mounted in holders 24, 25 at optional steps 320, 322. The holders 24, 25 are disposed on the conduit at optional 324.

The above described embodiments thus utilize a sensor disposed remotely from the process fluid flow path, to enable use in processes of relatively small line size, such as those using conduits with 2 inch (5 cm) diameters or less. Moreover, the use of diaphragms as shown and described, facilitates cleaning of the flowmeters to help meet sanitary application requirements.

The above described embodiments also use a fluid connection between the diaphragm(s) and sensor(s). However, it should be recognized that a mechanical connection may be used instead of the fluid connection, without departing from the spirit and scope of the present invention. For example, one skilled in the art should recognize, in light of the instant disclosure, that a sensor 22 or 23 may be mechanically coupled to each diaphragm 18, 19, (e.g., within diaphragm holders 24, 25, 24', 25'). The sensors may then be electrically coupled to processing module 48 in the manner shown and described with respect to FIG. 1.

In the preceding specification, the invention has been described with reference to specific exemplary embodiments Having described the invention, what is claimed is:

1. A sanitary vortex flowmeter comprising:
   a conduit for process fluid flow, said conduit having one or more inner walls defining a central bore;
   a shedder disposed within said central bore;
   first and second diaphragms embedded in opposite inner wall portions of the conduit, adjacent to the shedder;
   a sensor disposed externally to said conduit;
   a first fill tube containing fill fluid, configured for communicably coupling said first diaphragm to said sensor;
   a second fill tube containing fill fluid, configured for communicably coupling said second diaphragm to said sensor;
   a first diaphragm holder configured to maintain the first diaphragm in said embedded position on said conduit; and
   a second diaphragm holder configured to maintain the second diaphragm in said embedded position on said conduit.

2. A vortex flowmeter comprising:
   a conduit for process fluid flow in a downstream direction therethrough, said conduit having one or more inner wall portions defining a central bore;
   a shedder disposed within the central bore;
   a diaphragm embedded in an inner wall portion of said conduit, adjacent to the shedder;
   a sensor disposed remotely from said conduit; and
   a coupling configured to communicably couple said sensor to said diaphragm.

3. The flowmeter of claim 2, wherein said sensor is configured to detect pressure variations within the fill fluid.

4. The flowmeter of claim 2, comprising:
   an additional diaphragm embedded in another inner wall portion of said conduit, wherein said diaphragm and said additional diaphragm are disposed on opposite sides of the shedder from one another;
   an additional coupling configured for communicably coupling said additional diaphragm to a sensor.

5. The flowmeter of claim 4, wherein said coupling and said additional coupling each comprise a fill tube containing a fill fluid, each of said fill tubes being configured for communicably coupling said diaphragm, via the fill fluid, to said sensor.

6. The flowmeter of claim 4, wherein said coupling and said additional coupling each comprise a non-fluidic mechanical linkage, each of said linkages being configured for communicably coupling said diaphragm, via the linkage, to said sensor.

7. The flowmeter of claim 2, wherein said sensor is coupled to a transmitter.

8. The flowmeter of claim 4, wherein:
   a first diaphragm holder is configured to maintain said diaphragm in said embedded position on an inner wall portion of the conduit; and
   a second diaphragm holder is configured to maintain said additional diaphragm in said embedded position on an other inner wall portion of the conduit.

9. The flowmeter of claim 8, wherein said diaphragm and said additional diaphragm are respectively removable from said first and second diaphragm holders.

10. The flowmeter of claim 8, wherein said first and second diaphragm holders are each removably fastened to said conduit.

11. The flowmeter of claim 8, wherein said first and second diaphragm holders are integral with the inner conduit wall.

12. The flowmeter of claim 8, wherein said first diaphragm holder is configured to couple said diaphragm to said coupling.

13. The flowmeter of claim 12, wherein said second diaphragm holder is configured to couple said additional diaphragm to said additional coupling.

14. The flowmeter of claim 13, comprising a sensor holder configured to communicably couple said couplings to said sensor.

15. The flowmeter of claim 13, comprising a second sensor.

16. The flowmeter of claim 13, wherein said sensor is configured to detect pressure pulse trains within the couplings.

17. The flowmeter of claim 13, wherein said diaphragm and said additional diaphragm are configured to respectively impart the pulse trains to said coupling and said additional coupling, said pulse trains being respectively out of phase with one another.

18. The flowmeter of claim 17, further comprising a summation module configured to combine the pulse trains with one another.

19. The flowmeter of claim 18, wherein said summation module is configured to reverse the phase of one of the pulse trains relative to the other of the pulse trains.

20. The flowmeter of claim 19, wherein said coupling and said additional coupling are respectively communicably coupled to separate sensors.

21. The flowmeter of claim 20, wherein the summation module comprises a processor configured to receive pulse trains from a plurality of sensors.

22. The flowmeter of claim 19, wherein said coupling and said additional coupling are both communicably coupled to a single sensor.

23. The flowmeter of claim 22, wherein said summation module comprises a sensor holder configured to communicably couple said coupling and said additional coupling to opposite faces of a single sensor.

24. The flowmeter of claim 23, wherein said coupling and said additional coupling comprise first and second fill tubes, and said sensor holder is configured to communicably couple said first and second fill tubes to opposite faces of a single sensor.

25. The flowmeter of claim 24, wherein said sensor comprises a piezoelectric bimorph.

26. The flowmeter of claim 2, wherein said central bore has a transverse dimension of up to 2 inches (5 cm).

27. The flowmeter of claim 26, wherein said central bore has a transverse dimension ranging from at least about ¾ inch (1.9 cm) to about 1.5 inch (3.8 cm).

28. A method of producing a sanitary vortex flowmeter comprises:
   a) disposing a shedder within a central bore of a conduit for process fluid flow;
   b) mounting a diaphragm in an inner wall of the conduit, adjacent to the shedder;
   c) disposing at least one sensor externally to the conduit; and
   d) disposing a coupling between the diaphragm and the sensor to communicably couple the diaphragm to the sensor.

29. The method of claim 28, further comprising (e) mounting an additional diaphragm in an inner wall of the conduit, opposite from the diaphragm, and adjacent to the shedder.

30. The method of claim 29, further comprising (f) disposing an additional coupling between the additional diaphragm and the sensor to communicably couple the additional diaphragm to the sensor.

31. The method of claim 30, wherein said disposing (d) and said disposing (f) further comprise disposing couplings in the form of fill tubes containing fill fluid between the diaphragms and the sensor.

32. The method of claim 31, wherein said mounting (b) and said mounting (e) further comprise configuring the diaphragms to respectively impart pulse trains to said first and second fill tubes.

33. The method of claim 32, comprising configuring a summation module configured to combine the pulse trains with one another.

34. The method of claim 33, comprising configuring the summation module to reverse the phase of one of the pulse trains relative to the other of the pulse trains.

35. The method of claim 34, comprising communicably coupling said first and second fill tubes to opposite faces of said sensor.

36. The method of claim 35, comprising communicably coupling said sensor to a transmitter.

37. The method of claim 28, wherein said mounting (a) comprises mounting said first diaphragm in a first diaphragm holder, mounting said second diaphragm in a second diaphragm holder, and disposing said first and second diaphragm holders on the conduit.

* * * * *